United States Patent [19]
Evans

[11] Patent Number: 6,011,662
[45] Date of Patent: Jan. 4, 2000

[54] CUSTOM COLOR WHEEL

[75] Inventor: Nigel Evans, West Midlands, United Kingdom

[73] Assignee: Light & Sound Design, Ltd., Birmingham, United Kingdom

[21] Appl. No.: 09/108,777

[22] Filed: Jul. 1, 1998

[51] Int. Cl.[7] .................................................. G02B 5/22
[52] U.S. Cl. ..................... 359/891; 359/892; 359/885; 362/277; 362/282; 362/283
[58] Field of Search ...................... 359/885, 891, 359/892; 362/277, 280, 282, 283, 322, 323, 455

[56] References Cited

U.S. PATENT DOCUMENTS

5,060,126  10/1991  Tyler et al. ............................... 362/277

*Primary Examiner*—Cassandra Spyrou
*Assistant Examiner*—Craig Curtis
*Attorney, Agent, or Firm*—Fish & Richardson P.C.

[57] ABSTRACT

A color wheel for lighting fixtures comprising a hub wherein removable, user-selected dichroic filters are engaged by a spring element. The filters are removably held by two pegs extending upward and one nub extending downward. The filters can be lifted for removal.

20 Claims, 7 Drawing Sheets

CUSTOM COLOR WHEEL

FIELD

This disclosure relates to a rotatable color wheel for use with lighting equipment to produce multiple colors of light. More specifically, this disclosure provides a custom design color wheel with easily changeable, user-selected dichroic filters.

BACKGROUND

Some lighting equipment provides multiple colors by placing dichroic filters secured on a rotatable color wheel in the path of a light beam. Various color combinations can be produced by overlapping the filters.

The lighting fixture of U.S. Pat. No. 4,800,474 comprises two rotatable color wheels. The disclosure of this patent is herein incorporated by reference to the extent necessary for proper understanding. Each color wheel has a set of dichroic filters mounted about the periphery of a hub in which each of the filters in the set can be selectively positioned in a light beam by rotation of the color wheel. One of the color wheels is equipped with long wave pass dichroic filters while the other color wheel is equipped with short wave pass dichroic filters. By aligning various combinations of these filters, a number of different colors with different saturations can be produced.

The cutoff wavelengths for the dichroic filters are selected to be different at the long and short wavelengths for the filter set, such that there is a perceived uniform graduation of colors across the spectrum.

Each of the dichroic filters mounted on the color wheels is in a shape of a trapezoid and is mounted adjacent other filters, such that there is no blanking of light or leakage of light in the process of changing from one filter to the next.

This color wheel is constructed by joining two laminated aluminum plates. The diameter of the first plate is smaller than the diameter of the second plate. The difference in the diameters of the two plates form a step. The dichroic filters are bonded by an adhesive, preferably RTV silicon rubber, at the step. The dichroic filter is not easily removable after the filter is bonded to the plates by the adhesive.

The color wheel of U.S. Pat. No. 5,060,126 comprises a polygonal metal plate, which has slotted metal bars seated on the side edge of the polygonal plate with rectangular glass plates. One embodiment features dichroic filters adhesively held in the slots of the metal bars. The glass plates are not in direct contact with the metal bars and are spaced close to each other, but not in contact, in a peripheral array. The dichroic filters are not readily removed from the metal slots after the adhesive is applied.

The number of possible color combinations that can be produced by such a lighting fixture may be limited by the fixed number of secured filters on a particular color wheel. Some stage lighting applications may need different effects, and hence different sets of color filters during the course of a production. This may require custom color wheels.

SUMMARY

A color wheel is provided that has changeable filter elements. A hub has specific filter holding structures, including a spring element along the periphery of the hub.

Each color element has a color changing component mounted on a platform component. In a preferred embodiment, the platform component is shaped with concave edge elements, more preferably, half circles, that engage corresponding pegs on the hub, and a downwardly extending nub that engages with a corresponding cavity in the hub. The platform component has a beveled insertion edge on the top side.

The hub has a plurality of pegs and nub cavities. The color element is inserted into the hub and pressed down. The concave edge elements engage the pegs. The nub is inserted into the nub cavity. The color element is held in position on the hub by those structures as long as the bottom surface of the color element is pressed down against the hub. The spring element provides bias to do keep the element pressed down. The spring element extends just past the beveled edge on the platform component of the color element. The color element can be lifted from the hub by first lifting the spring element.

BRIEF DESCRIPTION OF THE DRAWING

These and other aspects will be described with reference to the drawings, in which.

DESCRIPTION OF THE PREFERRED EMBODIMENTS

Figure 1:
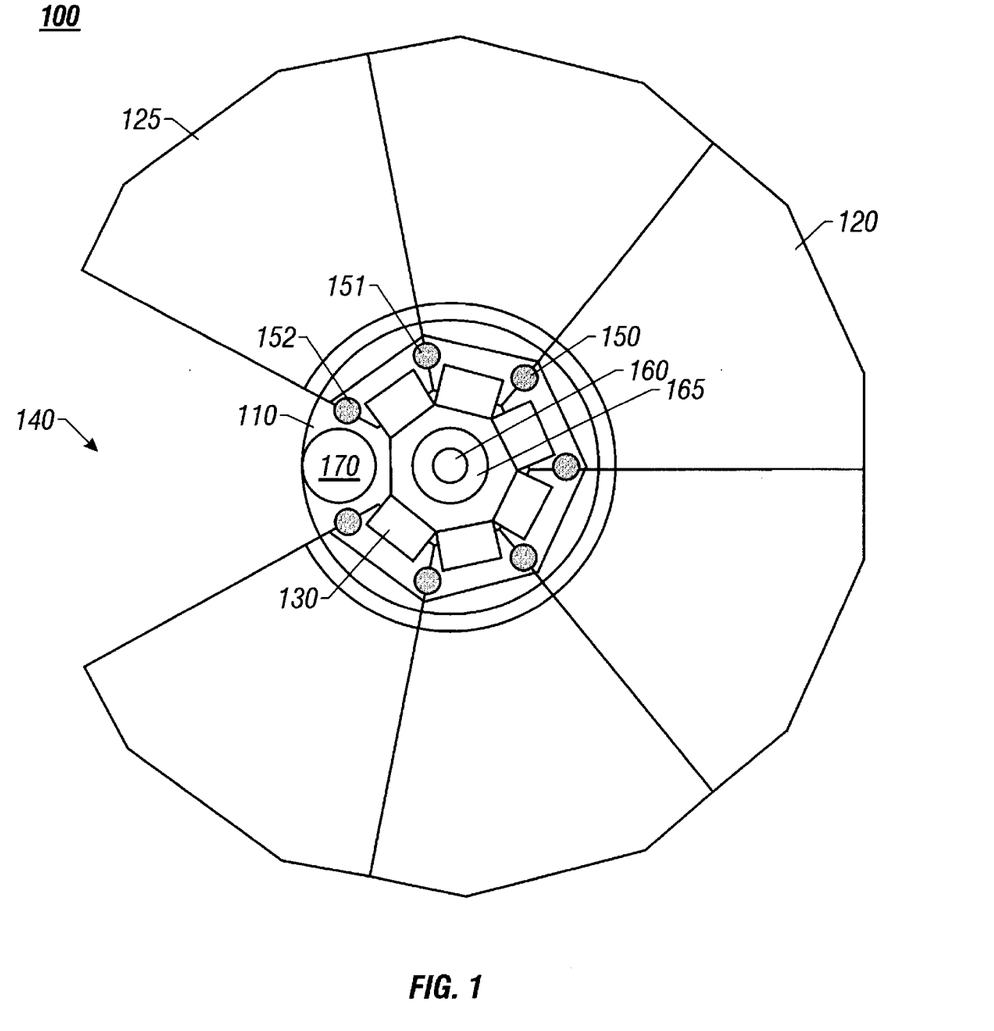
FIG. 1 shows a top-view of a color wheel assembled with color elements held by a spring element.

FIG. 1 shows a top-view of a color wheel 100.

The color wheel 100 is assembled with color changing elements 120 around the periphery of a hub 110. One position 140 is preferably left open with no color elements attached. The color elements 120 are held in place when they are flat against the hub. Spring element 130 biases those elements 120 to be flat; and the spring force can be overcome to remove the spring elements.

The hub holds the color elements using a central nub, and two outer pegs. Each color element 125 is shaped to engage between two adjacent pegs 151, 152. Each color element also has a downwardly projecting nub that extends into a corresponding nub recess in the hub.

The pegs 150 and nub cavity 215 are arranged generally into a triangular pattern for maximum holding.

The hub 110 also has a central opening 160. In one embodiment, a collar 165 can be affixed to the hub 110, surrounding the opening 160. The collar 165 is formed to engage a shaft passing through the central opening 160 for rotation of the color wheel 110. The spring element 130 is also adapted to allow a shaft to pass through a central opening 160. The hub 110 and the spring element 130 are superimposed such that a shaft can pass through the central opening 160.

A hole 170 is formed on the hub 110 at the open position 140. ??WHAT IS THIS HOLE FOR?? This hole 170 on the hub 110 reduces the total weight of the color wheel 100. Reducing the mass of the color wheel can be desirable. A reduced mass color wheel has a lower inertia which can facilitate operation during starting and stopping of the color wheel. However, the present inventors also anticipate an embodiment that comprises a color wheel without a hole 170.

Each color element 120 is firmly held in the hub 110. Once in place, color element 120 is held in position by the spring element 130. The user can lift the spring element 130 to allow lifting the color element 120 and hence removing it.

Figure 2A:
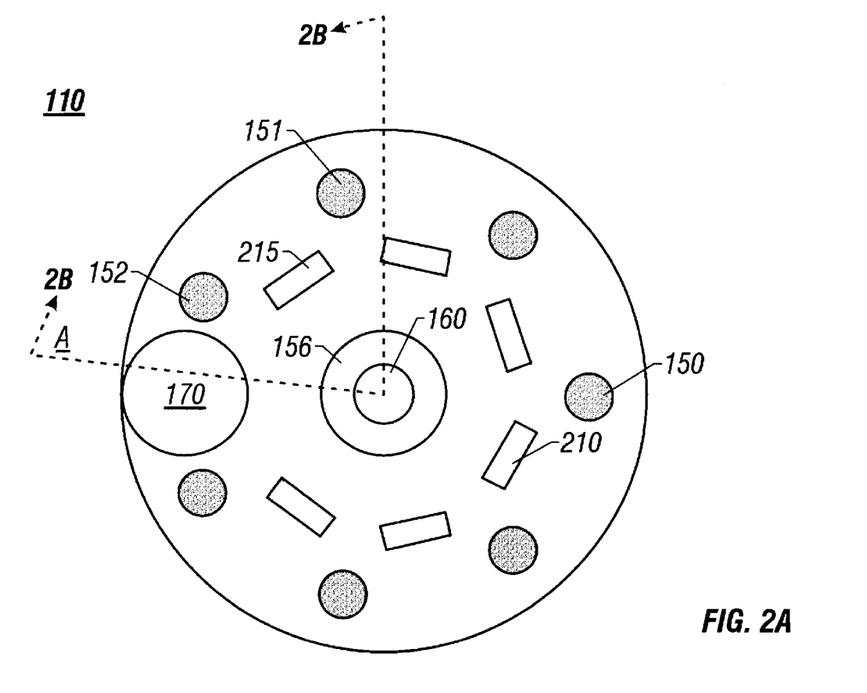
FIG. 2A shows a top-view of a hub.

FIG. 2A shows a top-view of the hub 110 with no color elements 120 attached. A detailed perspective view of area A is shown in FIG. 2B.

The hub 110 has a plurality of spaced pegs 150, 151, 152 and a plurality of nub cavities 210, 215. Defining the surface seen in FIG. 2A as the top, the pegs 150 stand vertically up from the top surface 171 of the hub 110. The pegs have a rounded outer surface of diameter x, and a top surface 155. The nub cavities 210 extend down into the hub 110. The nub cavities 215 define a substantially rectangular inner surface, spaced between and laterally distant from pegs 151, 152, thereby forming a triangular shape.

Each color element 125 on the color wheel 100 is held between the two pegs 151, 152, and also held by the one nub cavity 215.

Figure 2B:
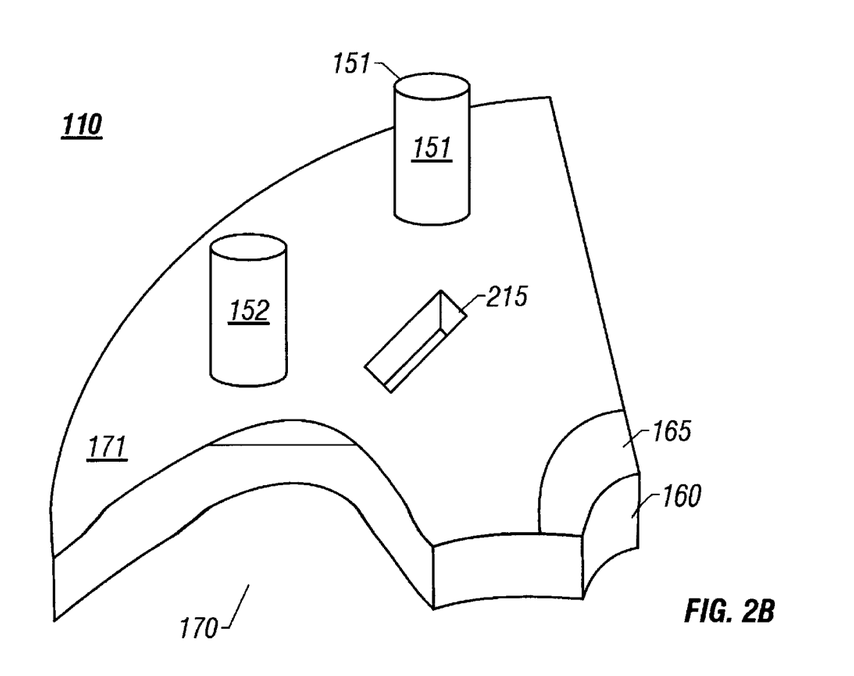
FIG. 2B shows a side-view of a hub.
Figure 3A:
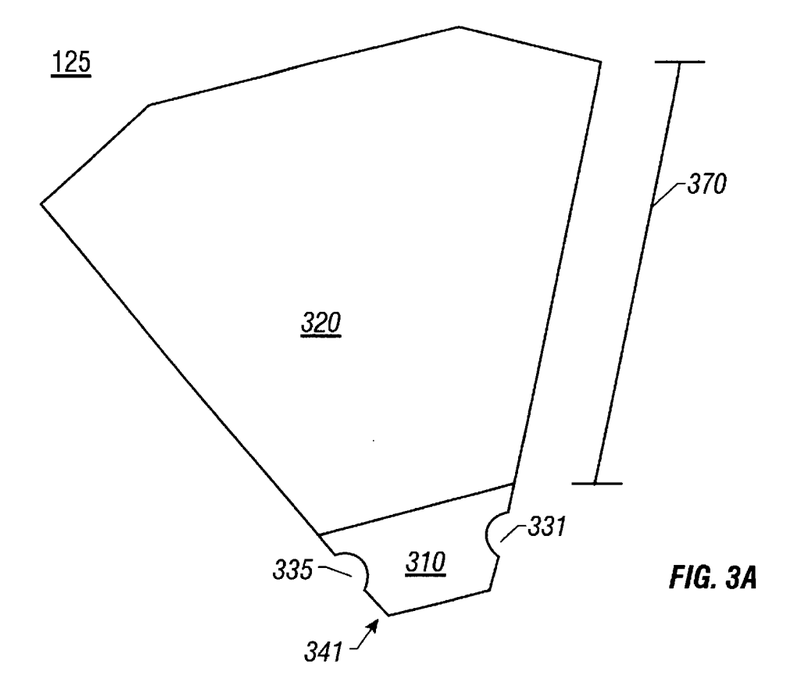
FIG. 3A shows a top-view of a color element having a platform component and a transparent component.

FIG. 3A shows a top-view of a color element 125 for use with the hub of FIGS. 2A–2B. Each color element 125 has a platform component 310 holding a color filtering component 320. The platform component 310 has concave openings 331, 335 that are shaped to engage between pegs 151, 152, respectively, along each side holding surface 341. The inner shape of each concave element 341 is substantially the same shape and size as the outer surface of the pegs. Each side holding surface 341 goes half way around the peg, and may also adjoin another side holding surface of a neighboring side holding surface.

Figure 3B:
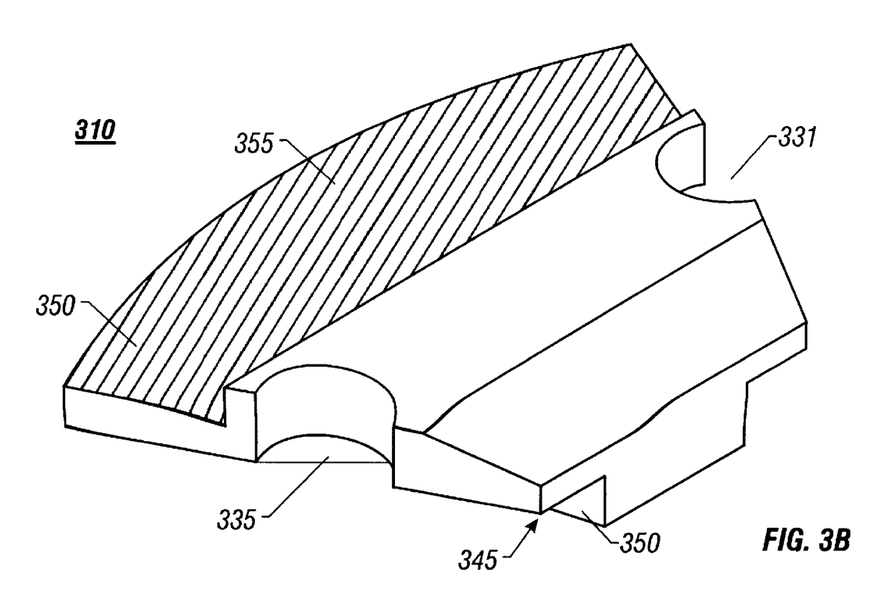
FIG. 3B shows a three-dimensional view of a platform component.

FIG. 3B shows a perspective view of one platform component 310. The platform component 310 has a beveled edge 340 slanting toward the center of the color wheel 100. A nub 350 is positioned on the bottom surface 345 of the beveled edge 340 and extends down farther than the otherwise flat bottom surface 345. The nub 350 has a substantially rectangular shape with substantially the same outer dimensions as the outer dimensions of the nub cavity and fits into nub cavity 215 on the hub 110 as explained herein.

A descending step 350, shown as the hatched area in FIG. 3B, is formed at the other end of the platform. In one embodiment, the step 350 has a roughened surface 355 for improved adhesion with the transparent component 320. The length 360 of the step 350 is selected to allow sufficient area for proper adhesion and support of the transparent component 320 on the color wheel 100. One possible adhesion material for attaching dichroic filters is RTV silicon rubber, available from General Electric and DuPont.

The transparent component 320 can be conventional colored glass or dichroic filters. Dichroic filters are well known in the art. Dichroic filters can be formed from a sheet of thermally resistant or refractory glass, e.g. PYREX™ or quartz. The sheet is coated to separate two pre-selected, complementary colors out of white light, one of which is reflected, and one transmitted.

Figure 4A:
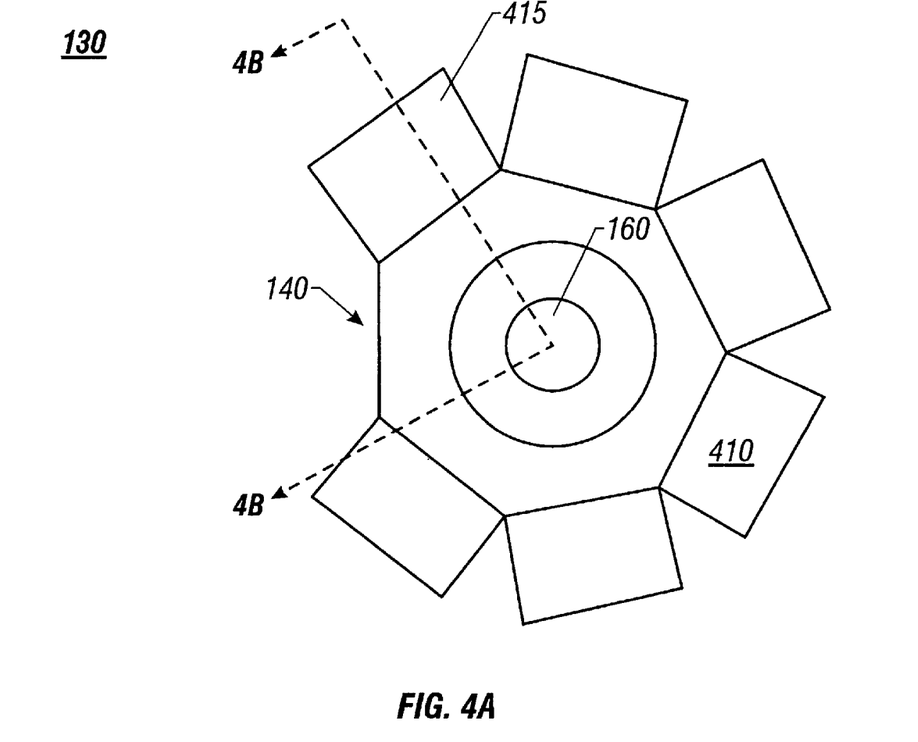
FIG. 4A shows a top-view of a six-way retainer spring element.

FIG. 4A shows a six-way retainer spring element 130. In an embodiment with six color elements on a color wheel, a six-way retainer spring element is used. Similarly, for an embodiment with n-color elements, an n-way retainer spring element can be used.

The spring element 130 biases the platform element 310 into its lowermost position, such that bottom surface 345 is pressed against top surface 171 of the hub. While pressed down like this, the color element 125 is maintained firmly in place between the vertical pegs 151,152, and in the nub cavity 215 on the hub 110.

The spring element 130 has a central opening 160, provided to allow a shaft to pass through. The six-way retainer spring element 130 has a plurality of arms 410. No arm is positioned at the open position 140.

Figure 4B:
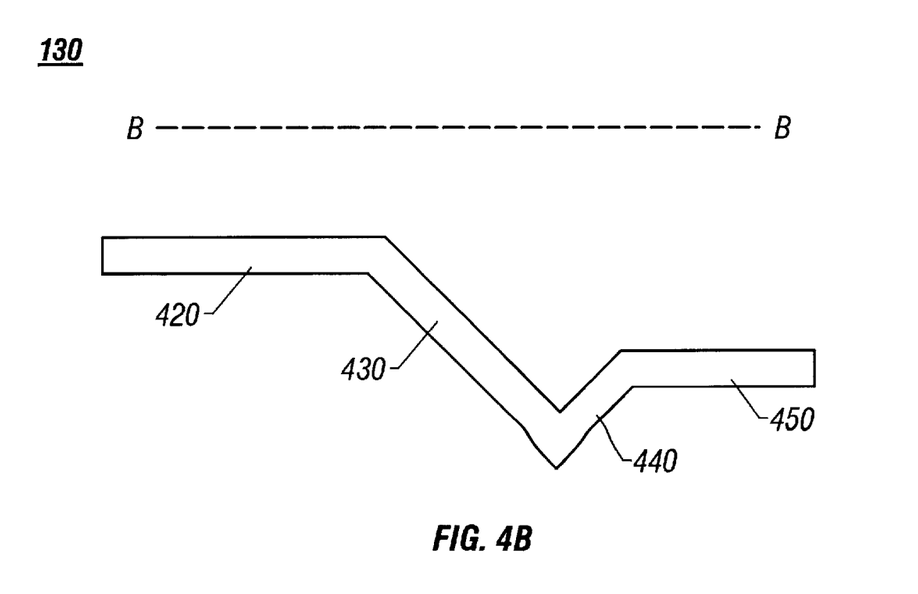
FIG. 4B shows a cross-sectional view of a six-way retainer spring element.

FIG. 4B shows the cross-section B—B of the spring element 130. The cross-section of the spring element 130 has a horizontal segment 420, a downward sloping segment 430, a slight upward sloping segment 440, and a small horizonal segment 450.

Figure 5:
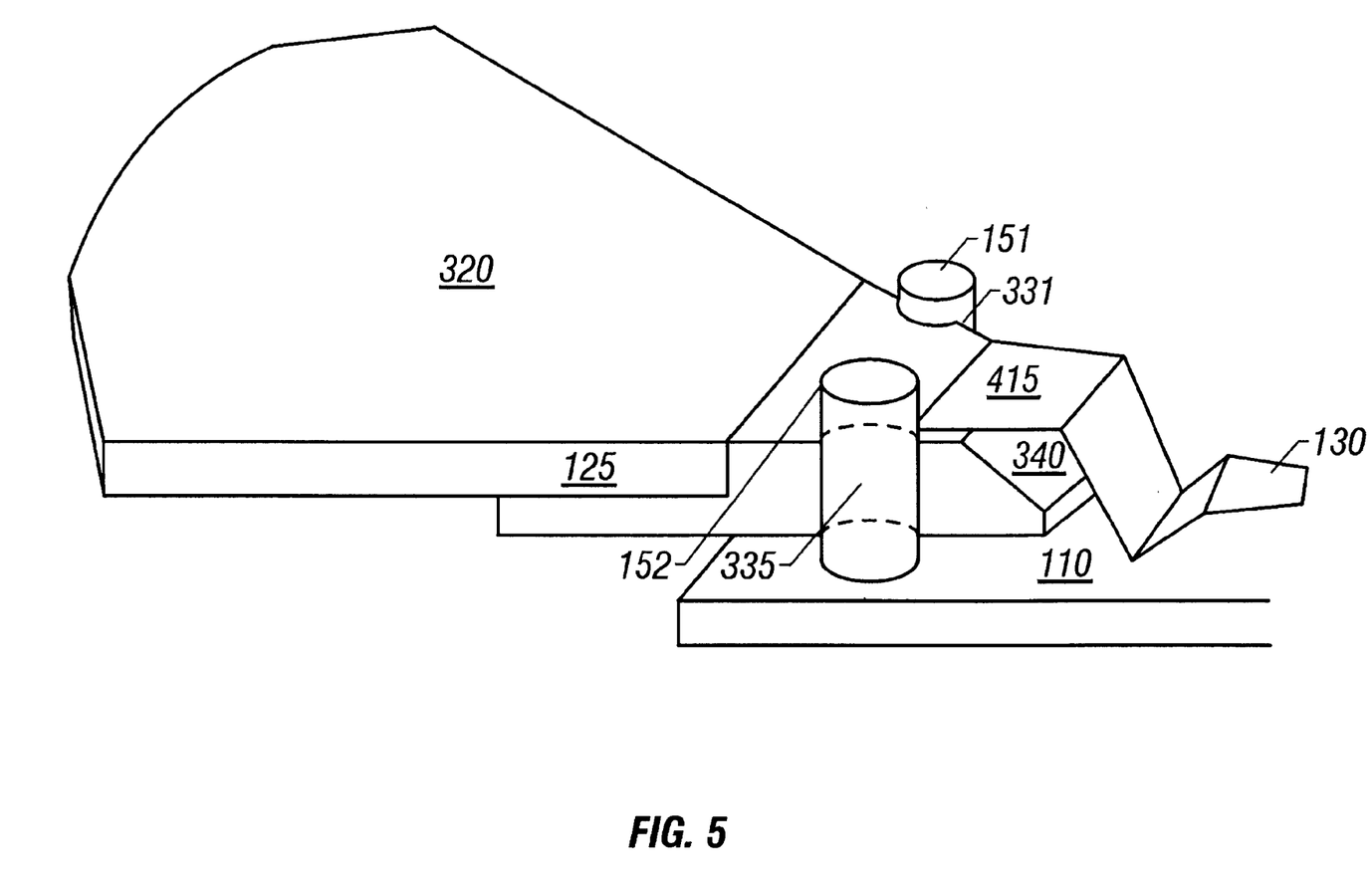
FIG. 5 shows a side-view of an engaged color element in a hub held by a spring element.

FIG. 5 is a side-view of an engaged color element 125 held in position by the spring element 130 in the hub 110. Each arm 415 of the spring element 130 extends just past the beveled edge 340 of the color element 125. Preferably, the arm 415 reaches the part of the platform 310 before the concave openings 331, 335 begin. The arm 415 does not extend past the platform component 310; the spring element 130 does not touch the transparent component 320 of the color element 125.

The color element 125 clicks into the hub 110. The concave openings 331, 335 engage the pegs 151, 152 respectively. The nub 350 fits into the nub cavity 215. When engaged, the nub 350 is not visible from the side-view as in FIG. 5 and the bottom surface 345 is pressed against the top surface 171 of the hub. The position of the color element 125 is securely maintained by the triangular layout of the supports. The supports extend in opposing directions, in the sense that two supports extend upward and one support extends downward.

Figure 6:
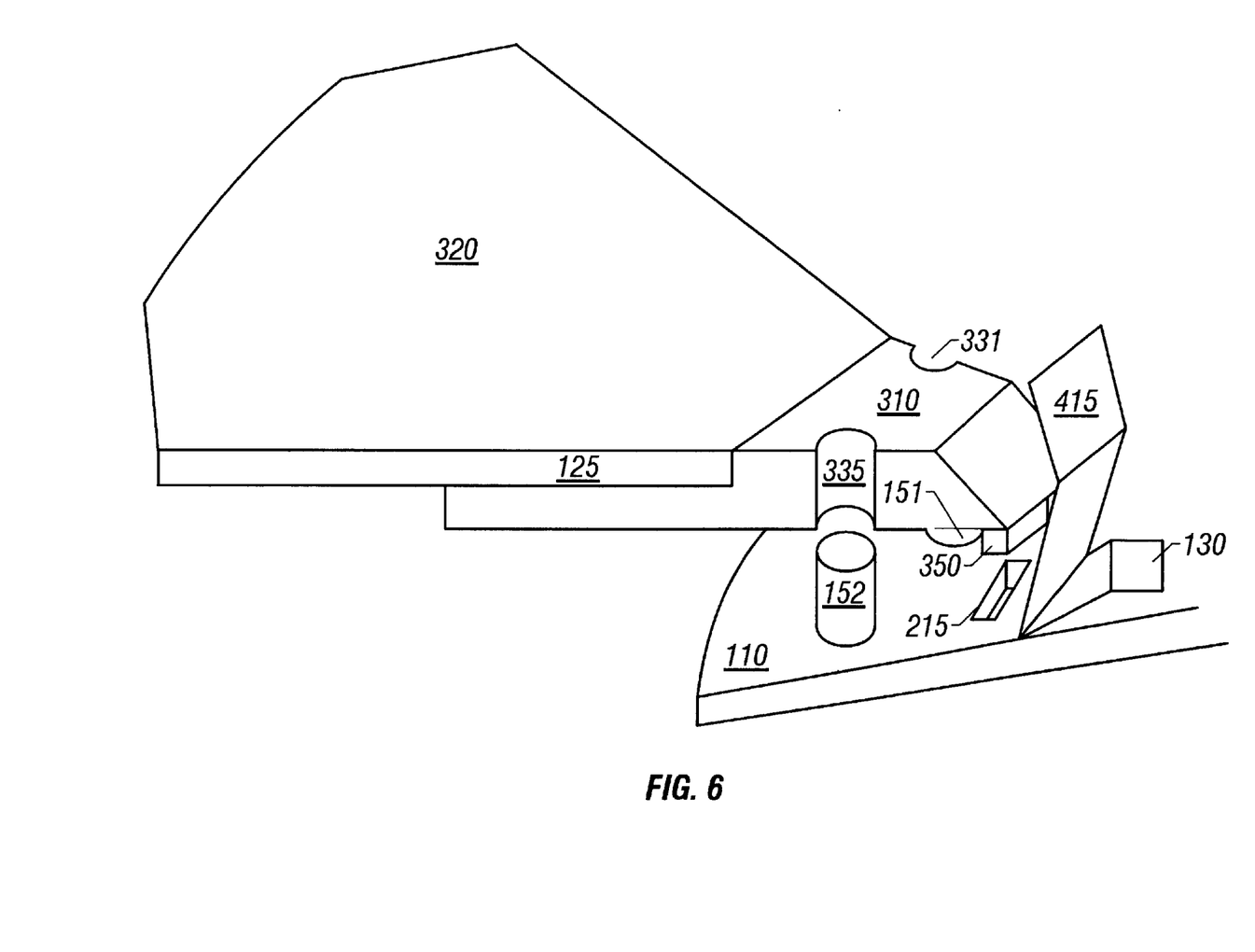
FIG. 6 shows a side-view of a disengaged color element in relation to the hub and the spring element.

The color element 125 can be removed from the hub 110 by lifting the spring element 130 as shown in FIG. 6. Since the spring element 130 extends just past the beveled edge 340, users may slide their fingers under the spring element 130 to lift the spring element 130. After the spring element 130 is lifted, the entire color element 125 can be lifted vertically from the hub 110. The filter element needs to be lifted sufficiently high that the bottom surface 145 is above the top surface 155 of the pegs 151, 152, and the nub is completely out of the hub recess. Then the color element 125 is in the position shown in FIG. 6, where it can be removed. The opposite operation, thereby lifting the spring, is carried out to insert a new color element.

Figure 7:
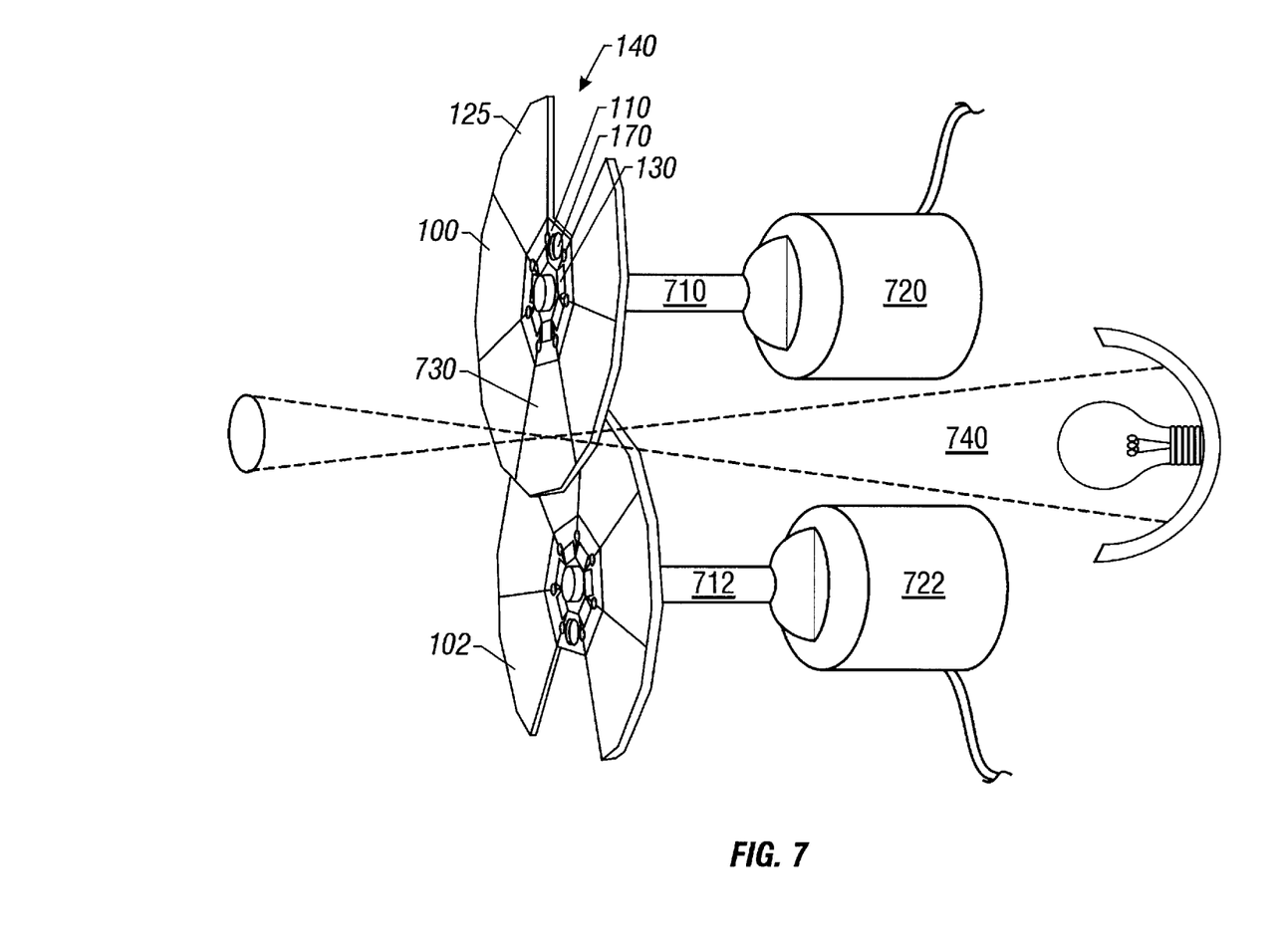
FIG. 7 shows a lighting device using a rotatable color wheel.

FIG. 7 shows one embodiment using the color wheel 100. Color wheels 100, 102 are adapted to engage shafts 710, 712, respectively. The color wheels 100, 102 are each rotated by a motor 720, 722 respectively. The color wheels 100, 102 are positioned such that the two color wheels 100, 102 overlap at one filter position 730. Filter position 730 is in the path of a beam of light 740.

Although only a few embodiments have been described in detail above, those having ordinary skill in the art will certainly understand that many modifications are possible in the preferred embodiment without departing from the teachings thereof. Other materials can be used to fabricate each part of the color wheel. The hub can be made without the hole 170. The platform can be made without a roughened surface 355 on the step 350. A plurality of color wheels can be incorporated in a lighting apparatus. Moreover, the nubs and pegs can be reversed or formed into different geometric shapes.

While three support structures—two pegs and a nub—are preferred in the form described herein, any arrangement or kind of structure could be used. At least one, more preferably two, and most preferably three structures in a triangular shape are contemplated. Moreover, the gender of the support structures can be reversed from that described herein—with pegs and cavities being switched.

All such modifications are intended to be encompassed within the following claims.

What is claimed is:

1. A color filter comprising:
   a hub having a top surface having at least one first shaped peg which extends above the top surface and at least one second shaped nub cavity extending below said first surface;
   at least one color element, having a bottom surface, and having at least one peg accepting surface, shaped to engage with at least a portion and said peg, and at least one nub, shaped to engage with at least a portion of said nub cavity on said hub; and
   a spring element, positioned to hold at least one color element in place on said hub.

2. A color filter as in claim 1, wherein said at least one color element is pressed down to engage and lifted to remove.

3. A color filter as in claim 1, wherein there are a total of three of said pegs and nub cavities on said hub, arranged generally into a triangular shape.

4. A color filter as in claim 3, wherein said pegs are cylindrical and said nub cavities are rectangular.

5. A color filter as in claim 2, wherein said spring includes a lifting surface, facilitating its lifting so that said color element can be lifted.

6. A filter as in claim 1, wherein there are two of said pegs and said color elements are shaped with peg accepting surfaces at side surfaces thereof.

7. A color filter as in claim 6, wherein said pegs are cylindrical.

8. A color filter as in claim 7, wherein said accepting surfaces are the shape of half circles.

9. A removable assembly comprising:
   a platform component, formed with a top surface with a beveled edge, a bottom surface with an extending nub and shaped side surfaces formed into a predetermined shape, and a filter attachment portion having a surface to which a filter can be attached, said attachment portion having a first length; and
   a hub portion, having a nub cavity shaped to accept said nub of said platform component, and having extending pegs, shaped to interact with said shaped side surfaces of said platform component.

10. An assembly as in claim 1, further comprising a transparent component fixably supported on said filter attachment portion of said platform component, wherein said transparent component has a second length, and said second length is longer than said first length.

11. An assembly as in claim 9, wherein said filter attachment portion has a roughened surface formed to facilitate adhesion of an object.

12. An assembly as in claim 9, wherein said pegs are cylindrical.

13. A removable color filter assembly comprising:
   a hub having a support surface and at least one first gender supporting structure;
   a color filter holding assembly, including a color filtering element, and having a second gender supporting structure, said second gender supporting structure interacting with said first gender supporting structure; and
   a removable holding element, holding said color filter holding assembly relative to said hub when in a first position, and allowing release of said color filter holding assembly relative to said hub in a second position.

14. An assembly as in claim 13, wherein there are two of each of said first and second gender supporting structures.

15. An assembly as in claim 13, wherein there are three of each of said first and second gender supporting structures.

16. An assembly as in claim 15, wherein said supporting structures are arranged in a triangular shape.

17. An assembly as in claim 13, wherein said supporting structures comprise a plurality of pegs and nub cavities formed on said support layer, wherein said pegs protrude from said support layer and said nub cavities are hollowed into said support layer.

18. An assembly as in claim 13, wherein said removable holding element comprises a spring element that has:
   a horizontal segment having a first length;
   a downward sloping segment having a second length;
   a upward sloping segment having a third length;
   a second horizontal segment having a fourth length,
   wherein said first and second lengths are greater than said third and fourth lengths.

19. An assembly as in claim 13, wherein said holding assembly has a beveled surface, and said holding element comprises:
   a spring component engageable with said beveled surface, wherein when engaged, said spring component holds said beveled structure in place, said component further allows said beveled structure to be lifted when said component is lifted from the surface of the beveled structure.

20. A method of engaging selectively removable color elements on a color wheel comprising:
   obtaining a support surface having a plurality of support structures, including at least one protruding peg and a cavity;
   obtaining at least one color element having a protruding nub shaped to interact with and enter said cavity, and a peg interacting surface shaped to engage with said protruding peg;
   engaging said color element with said support surface such that said nub is within said cavity, and said peg interacting surface is interacting with said peg;
   holding said color element in place on said support surface when desired; and
   allowing said element to be lifted such that a bottom surface of said nub is above said support surface for removal of said color element.

* * * * *